US008485037B1

(12) United States Patent
Takacs et al.

(10) Patent No.: US 8,485,037 B1
(45) Date of Patent: Jul. 16, 2013

(54) HIDDEN OBJECT DETECTION SYSTEM

(75) Inventors: John F. Takacs, Long Beach, CA (US); Frederick L. Davis, Los Angeles, CA (US); James E. Brown, Los Angeles, CA (US); Cecil L. Hayes, Placentia, CA (US); Wilfred Shigeki Otaguro, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 12/914,640

(22) Filed: Oct. 28, 2010

(51) Int. Cl.
*G01S 15/02* (2006.01)

(52) U.S. Cl.
USPC .............................................. 73/643; 367/99

(58) Field of Classification Search
USPC .................. 73/643, 657; 356/486; 367/99
See application file for complete search history.

(56) References Cited

U.S. PATENT DOCUMENTS

| | | | |
|---|---|---|---|
| 5,973,999 | A | 10/1999 | Naff et al. |
| 6,081,481 | A * | 6/2000 | Sabatier et al. ............ 367/8 |
| 6,360,173 | B1 | 3/2002 | Fullerton |
| 6,417,797 | B1 | 7/2002 | Cousins et al. |
| 2005/0223407 | A1 | 10/2005 | Fullerton et al. |
| 2007/0091316 | A1 | 4/2007 | Lal et al. |

FOREIGN PATENT DOCUMENTS

WO  2008051298 A2  5/2008

OTHER PUBLICATIONS

Writer et al., "Mine detection with a forward moving portable laser Doppler vibrometer," In Detection and Remediation Technologies for Mines and Minelike Targets VII, Proceedings of SPIE vol. 4742, pp. 649-653 (2002).*

"Defense Acquisition Guidebook", Mar. 2010, pp. 1-844 https://dag.dau.mil.

Department of Defense Instruction Operation of the Defense Acquisition System, No. 5000.0, Dec. 2, 2008, pp. 1-79.

Donskoy et al., "Nonlinear seismo-acoustic land mine detection and discrimination", J. Accoust. Soc. Am. 111 (6) Jun. 2002, pp. 2705-2714.

Xiang et al., "An experimental study on antipersonnel land mine detection using acoustic-seismic coupling", J Accoust. Soc. Am. 113 (3) Mar. 2003, pp. 1333-1341.

Valeau et al., "Development of a time-frequency representation for acoustic detection of buried objects", J. Accoust. Soc. Am.116 (5) Nov. 2004, pp. 2984-2995.

(Continued)

*Primary Examiner* — John Chapman, Jr.
(74) *Attorney, Agent, or Firm* — Yee & Associates, P.C.

(57) ABSTRACT

An apparatus comprising a vibration generation system, a vibration measurement system, and an optical system associated with the vibration measurement system, and a controller. The vibration generation system is configured to generate acoustic energy that causes vibrations to occur in the ground. The vibration measurement system is configured to transmit laser beams to the surface of the ground in which the vibrations occur, receive responses to the laser beams, and generate vibration data from the responses. The optical system is configured to direct the laser beams to the surface of the ground such that the laser beams have a selected spatial arrangement relative to the surface. The controller is configured to determine whether an object is present under the surface of the ground using the vibration data.

23 Claims, 7 Drawing Sheets

OTHER PUBLICATIONS

Xiang et al., "Acoustic-to-Seismic Landmine Detection Using a Continuously Scanning Laser Doppler Vibrometer", Proc. of SPIE vol. 5089 (2003), Detection and Remediation Technologies for Mines and Minelike Targets VIII, pp. 591-595.

Sabatier et al., "High Frequency A/S Coupling for AP Buried Landmine Detection using Laser Doppler Vibrometers", Proc. of SPIE vol. 5415 (2004), Detection and Remediation Technologies for Mines and Minelike Targets IX, pp. 35-41.

Scott et al, "Experimental Model for a Seismic Landmine Detection System", IEEE Transactions on Geoscience and Remote Sensing, vol. 39, No. 6, Jun. 2001, pp. 1155-1164.

Anderson et al., "Ultra-wideband beamforming in sparse arrays", IEEE Proceedings-H, vol. 138, No. 4, Aug. 1991, pp. 342-346.

"Seismic Source White Paper", The Boeing Company, Aug. 24, 2010, pp. 1-20.

* cited by examiner

HIDDEN OBJECT DETECTION SYSTEM

BACKGROUND INFORMATION

1. Field

The present disclosure relates generally to detecting objects and, in particular, to detecting hidden objects. Still more particularly, the present disclosure relates to a method and apparatus for detecting objects under the ground.

2. Background

Improvised explosive devices (IEDs) are explosive devices that may be hidden. An improvised explosive device typically includes an explosive charge, a detonator, and an initiator system to set off the device. In some cases, an improvised explosive device also may include shrapnel-generating objects. These bombs may be hidden any number of different ways. For example, an improvised explosive device may be hidden under debris, under the ground, or in other locations. Improvised explosive devices may be triggered in a number of different ways. For example, they may be triggered by a radio frequency device, infrared light beams, cell phones, pressure, and through other mechanisms.

The detection of improvised explosive devices is desirable to avoid damage to equipment and personnel. Techniques that are used to detect improvised explosive devices include, for example, radar systems, metal detectors, image changes, chemical detectors, and other suitable types of technologies.

Different technologies may have advantages over others. For example, radar systems may be able to detect improvised explosive devices in the ground that may be undetectable by metal detectors. Metal detectors may not detect improvised explosive devices that do not include sufficient metal components.

Jamming devices may prevent the triggering of improvised explosive devices that are controlled by radio frequency devices. These types of systems, however, do not prevent the triggering of improvised explosive devices that work on pressure or are connected to a triggering mechanism by wire.

Another example is identifying changes in images over an area. For example, images may be taken of a road over different periods of time. Changes to the road may indicate that an improvised explosive device is present. For example, recently turned over soil by a road, an abandoned vehicle, or other signs may indicate the presence of an improvised explosive device. This type of technique, however, requires monitoring of an area. The monitoring should occur often enough to detect when an improvised explosive device has been placed in the area. This type of detection requires resources and time to analyze images from different periods of time.

Therefore, it would be advantageous to have a method and apparatus that takes into account at least some of the issues discussed above, as well as possibly other issues.

SUMMARY

In one advantageous embodiment, an apparatus comprises a vibration generation system, a vibration measurement system, an optical system associated with the vibration measurement system, and a controller. The vibration generation system is configured to generate acoustic energy that causes vibrations to occur in the ground. The vibration measurement system is configured to transmit a number of laser beams to the surface of the ground in which the vibrations occur, receive a number of responses to the number of laser beams, and generate vibration data from the number of responses. The optical system is configured to direct the number of laser beams to the surface of the ground such that the number of laser beams has a selected spatial arrangement relative to the surface. The controller is configured to determine whether an object is present under the surface of the ground using the vibration data.

In another advantageous embodiment, a method is provided for detecting objects. A vehicle is moved along a surface of a ground. The vehicle has an object detection system comprising a vibration generation system, a vibration measurement system, an optical system associated with the vibration measurement system, and a controller. The vibration generation system is configured to generate acoustic energy that causes vibrations to occur in the ground. The vibration measurement system is configured to transmit a number of laser beams to the surface of the ground in which the vibrations occur, receive a number of responses to the number of laser beams, and generate vibration data from the number of responses. The optical system is configured to direct the number of laser beams to the surface of the ground such that the number of laser beams has a selected spatial arrangement relative to the surface. The controller is configured to determine whether an object is present under the surface of the ground using the vibration data. A determination is made as to whether the object is present under the ground using the object detection system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of considerations. A number, as used herein with reference to items, means one or more items. For example, a number of considerations is one or more considerations.

The different advantageous embodiments recognize and take into account that different object detection systems have different advantages and disadvantages. The different advantageous embodiments recognize and take into account that in some situations, it would be desirable to have an object detection system that is easily moveable. For example, the different advantageous embodiments recognize and take into account that it would be desirable to have an object detection system that is capable of being mounted in a vehicle or carried by personnel.

The different advantageous embodiments recognize and take into account that many object detection systems that can be moved may require the vehicle to be stationary. The vehicle may stop at a location and use an object detection system to scan an area ahead of the vehicle. Afterwards, the vehicle can then move forward over the scanned area. As a result, the detection of hidden objects, such as improvised explosive devices, may take more time and effort than desired.

The different advantageous embodiments also recognize and take into account that laser Doppler vibrometers may be used to detect objects, such as improvised explosive devices or mines under the ground. These types of vibrometers measure vibrations in the ground. The different advantageous embodiments recognize and take into account that with these types of systems, the vehicle may generate vibrations using a heavy object that impacts the ground.

The different advantageous embodiments recognize and take into account that, although this type of system allows for detection of objects under the ground, the vehicle is stationary when the object impacts the ground. Thus, an area of a road may be searched for improvised explosive devices while the vehicle is stationary. This type of system, however, slows down the speed at which a vehicle may travel when stops occur to search for improvised explosive devices.

Thus, the different advantageous embodiments provide a method and apparatus for detecting objects. In particular, the different advantageous embodiments provide a method and apparatus for detecting objects that may be hidden under the ground. In one advantageous embodiment, an object detection system comprises a vibration generation system, a vibration measurement system, and a controller. The vibration generation system is configured to generate acoustic energy that causes the vibrations to occur in the ground. The vibration measurement system is configured to transmit a number of laser beams to a surface of the ground, receive a number of responses to the number of laser beams, and generate vibration data from the number of responses. The controller is configured to determine whether or not an object is present under the surface of the ground using the vibration data.

Figure 1:
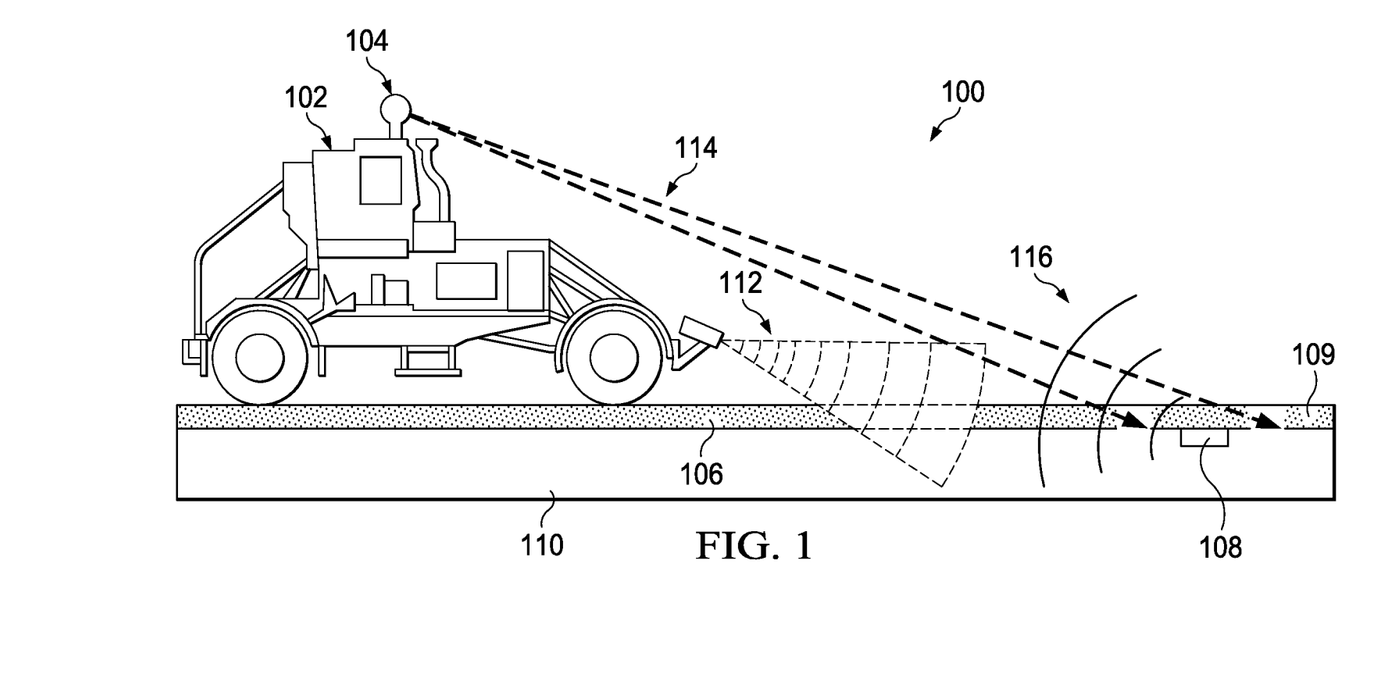
FIG. 1 is an illustration of an object detection environment in accordance with an advantageous embodiment.

With reference now to FIG. 1, an illustration of an object detection environment is depicted in accordance with an advantageous embodiment. Object detection environment 100 includes vehicle 102 with object detection system 104. In these illustrative examples, vehicle 102 travels on road 106.

With one or more of the different advantageous embodiments, vehicle 102 travels on road 106, while using object detection system 104. Object detection system 104 is configured to detect object 108 under surface 109 of ground 110. In these examples, object 108 may be an explosive device, such as an improvised explosive device.

In these illustrative examples, object detection system 104 generates acoustic waves 112 to generate vibrations in ground 110 ahead of vehicle 102. Object detection system 104 also emits laser beams 114. Laser beams 114 are moved in a pattern to scan road 106 ahead of vehicle 102. In particular, laser beams 114 are moved in a pattern to scan surface 109 of ground 110. Acoustic waves 112 generate vibrations in ground 110 that are detected by object detection system 104 receiving responses 116 to laser beams 114.

Figure 2:
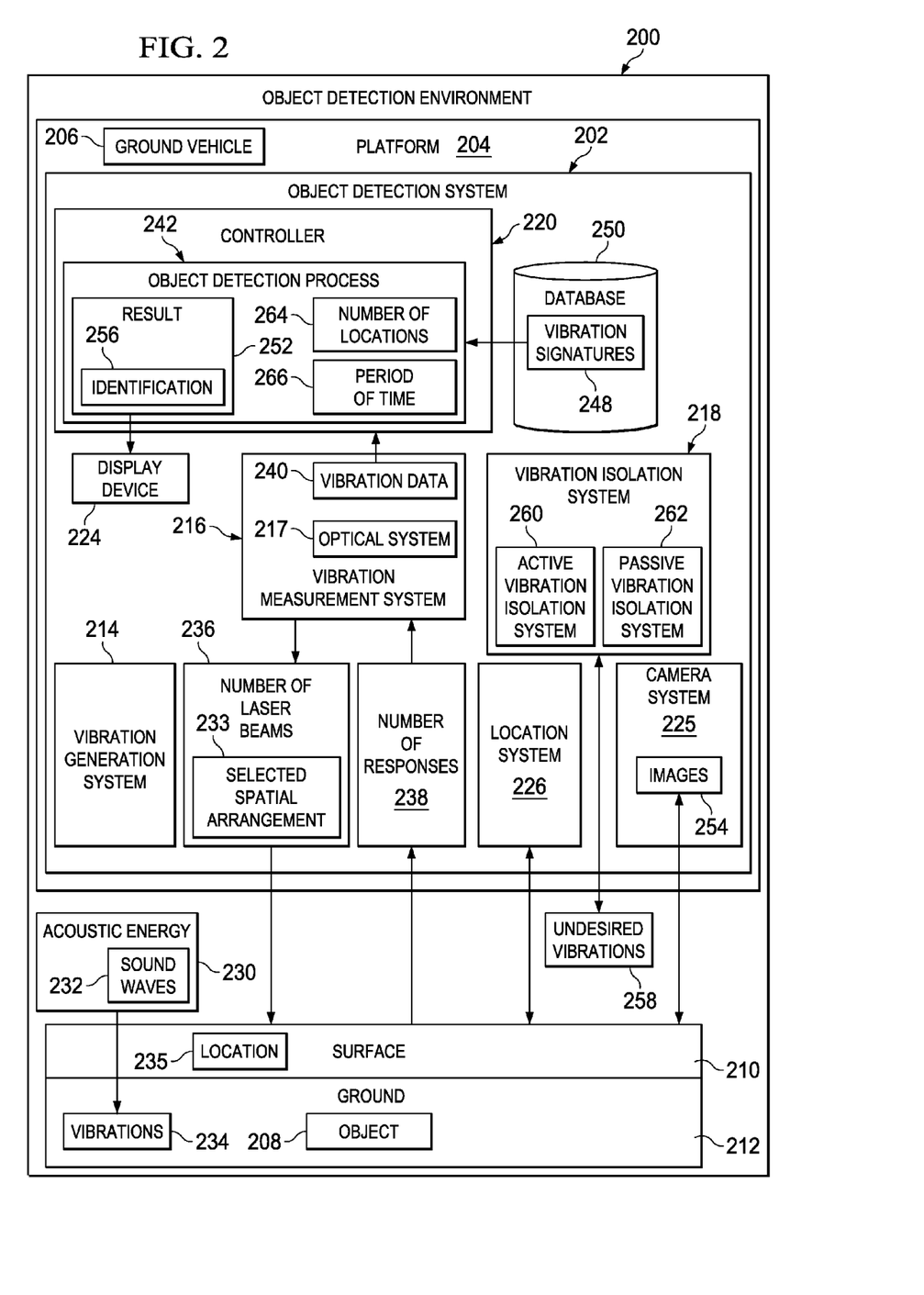
FIG. 2 is an illustration of an object detection environment in accordance with an advantageous embodiment.

With reference next to FIG. 2, an illustration of an object detection environment is depicted in accordance with an advantageous embodiment. Object detection environment 100 in FIG. 1 is an example of one implementation of object detection environment 200 in FIG. 2.

In this illustrative example, object detection system 202 is associated with platform 204. A first component may be considered to be associated with a second component by being secured to the second component, bonded to the second component, fastened to the second component, and/or connected to the second component in some other suitable manner. The first component also may be connected to the second component using a third component. The first component may also be considered to be associated with the second component by being formed as part of and/or an extension of the second component.

Platform 204 may be a mobile platform or a stationary platform. In these illustrative examples, platform 204 takes the form of ground vehicle 206.

Object detection system 202 is used to detect object 208. In particular, object 208 may be hidden from view. In these illustrative examples, object 208 is located under surface 210 of ground 212.

As illustrated, object detection system 202 includes vibration generation system 214, vibration measurement system 216, vibration isolation system 218, controller 220, display device 224, camera system 225, and location system 226.

In these illustrative examples, vibration generation system 214 is configured to generate acoustic energy 230 that causes vibrations 234 to occur in ground 212. As one illustrative example, acoustic energy 230 is directed towards surface 210 of ground 212. In these illustrative examples, acoustic energy 230 takes the form of sound waves 232. Sound waves 232 cause vibrations 234 to occur in ground 212. When object 208 is present under surface 210 of ground 212, vibrations 234 may have characteristics that are unique to object 208.

Vibration measurement system 216 generates number of laser beams 236. Number of laser beams 236 is transmitted to surface 210 of ground 212 in which vibrations 234 occur.

In these depicted examples, vibration measurement system 216 comprises optical system 217. Optical system 217 is configured to direct number of laser beams 236 to surface 210 such that number of laser beams 236 has selected spatial arrangement 233 relative to surface 210 of ground 212. In particular, optical system 217 may have a number of mirrors configured to direct number of laser beams 236 at location 235 on ground 212 such that number of laser beams 236 has selected spatial arrangement 233 at location 235.

A spatial arrangement for number of laser beams 236 includes a shape and/or size of number of laser beams 236 in an array and a distance from each laser beam to adjacent laser beams. For example, without limitation, selected spatial arrangement 233 for number of laser beams 236 at location 235 may be a 4×6 rectangular array with a distance of about four inches between each laser beam and the adjacent laser beams. Different spatial arrangements for number of laser beams 236 may be selected for different locations on surface 210 of ground 212.

In these illustrative examples, vibration measurement system 216 receives number of responses 238 from the transmission of number of laser beams 236 onto ground 212. Number of responses 238 is used to generate vibration data 240.

Selected spatial arrangement 233 may be changed to increase the resolution of vibration data 240. For example, without limitation, vibration data 240 may be used to generate two-dimensional images of surface 210 of ground 212. Selected spatial arrangement 233 for number of laser beams 236 may be changed to increase the resolution of the two-dimensional images generated. In particular, the distance between laser beams may be reduced to increase the resolution of the images.

Controller 220 is configured to determine whether object 208 is present under surface 210 of ground 212. Controller 220 may be implemented in a number of different ways. For example, controller 220 may take the form of a processor unit, a computer system, and a hardware unit. In some examples, object detection process 242 may be implemented by running program code on controller 220. In other illustrative examples, object detection process 242 may be embodied within circuits and other hardware in controller 220 without needing program code.

In these illustrative examples, object detection process 242 runs on controller 220. Object detection process 242 compares vibration data 240 to vibration signatures 248 in database 250. Vibration signatures 248 contain vibration data for known objects that have been previously tested in these illustrative examples.

As one illustrative example, vibration data 240 and vibration signatures 248 may be used to generate two-dimensional images. The two-dimensional images for vibration data 240 may be compared to the two-dimensional images for vibration signatures 248. Different types of techniques, such as, for example, without limitation, pattern matching, may be used to identify object 208 and/or a particular type of object.

For example, object 208 may be identified as a particular type of improvised explosive device, a mine, a buried weapon, tunnel, or some other suitable type of object. Additionally, vibration signatures 248 may be used to determine whether object 208 is present, even if object 208 cannot be identified as a particular type of object.

In the illustrative examples, object detection process 242 analyzes vibration data 240 and generates result 252. Result 252 may be displayed on display device 224. Display device 224 is a hardware device that displays information.

In these illustrative examples, camera system 225 generates images 254. In these examples, images 254 may be still or moving images. Images 254 are images of surface 210 of ground 212.

In these illustrative examples, result 252 may take the form of identification 256 of the location of object 208. Object detection process 242 may display identification 256 in a location on images 254 corresponding to the location of object 208. In other words, identification 256 may be displayed in a location on images 254 that indicates where under surface 210 of ground 212 object 208 is present.

In these illustrative examples, vibration isolation system 218 reduces an undesired effect of vibrations 258 that may occur within platform 204 or object detection system 202. For example, vibration isolation system 218 reduces changes to vibration data 240 caused by vibrations 258 that may prevent identification 256 of object 208 from being made. Undesired vibrations 258 may include vibrations from the engine of ground vehicle 206, vibrations from movement of ground vehicle 206, and/or other types of vibrations. Vibration isolation system 218 may be at least one of active vibration isolation system 260 and passive vibration isolation system 262.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

For example, active vibration isolation system 260 may be a noise cancellation system. The noise cancellation system may detect vibrations 258 and generate vibrations that cancel vibrations 258. Passive vibration isolation system 262 may be, for example, without limitation, a system that dampens or reduces vibrations that may occur within platform 204 and object detection system 202.

In these illustrative examples, location system 226 is configured to identify at least one of a location and movement of ground vehicle 206. Location system 226 may be, for example, without limitation, at least one of a global positioning system unit, an inertial measurement unit, and some other suitable type of location system.

With location system 226, controller 220 may use this information to control movement of number of laser beams 236 to target number of locations 264. In other words, controller 220 may control the positioning or movement of number of laser beams 236 to make measurements in different areas, even though ground vehicle 206 moves or vibrations may occur.

Additionally, controller 220 is configured to control movement of number of laser beams 236 to remain at number of locations 264 for period of time 266 to obtain a sufficient response or data in number of responses 238 to generate vibration data 240 that can be used for determining whether object 208 is present under surface 210 of ground 212 at number of locations 264.

With the different advantageous embodiments, the detection of objects under surface 210 of ground 212 may be improved. The detection of object 208 may be performed while ground vehicle 206 is moving or stationary. With one or more different advantageous embodiments, ground vehicle 206 may move while maintaining a desired level of accuracy in detecting objects that may be hidden under surface 210 of ground 212.

Figure 3:
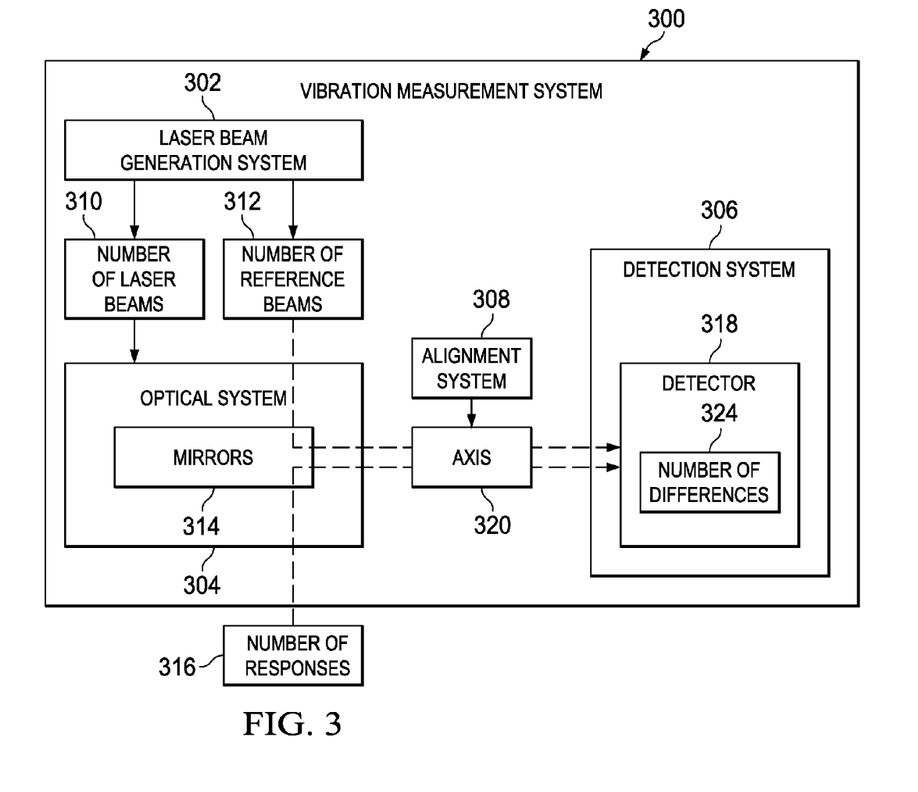
FIG. 3 is an illustration of a vibration measurement system in accordance with an advantageous embodiment.

With reference now to FIG. 3, an illustration of a vibration measurement system is depicted in accordance with an advantageous embodiment. Vibration measurement system 300 is an example of one implementation for vibration measurement system 216 in FIG. 2.

As illustrated, vibration measurement system 300 includes laser beam generation system 302, optical system 304, detection system 306, and alignment system 308.

Laser beam generation system 302 is configured to generate number of laser beams 310 and number of reference beams 312. Each reference beam in number of reference beams 312 corresponds to a laser beam in number of laser beams 310. In particular, in this illustrative example, a reference beam in number of reference beams 312 is formed from a portion of a laser beam in number of laser beams 310. For example, the laser beam generated by laser beam generation system 302 is split into two portions. One of these portions of the laser beam forms the reference beam.

Optical system 304 contains mirrors 314. Optical system 304 is configured to direct number of laser beams 310 to the surface of the ground and to detect number of responses 316.

Detection system 306 includes detector 318. Optical system 304 directs number of reference beams 312 and number of responses 316 onto detector 318. In these illustrative examples, number of responses 316 and number of reference beams 312 are directed along axis 320 to detector 318. Alignment system 308 is configured to keep number of responses 316 and number of reference beams 312 travelling along axis 320 to detector 318.

Detector 318 generates vibration data as number of differences 324 between number of responses 316 and number of reference beams 312. Detector 318 may be a number of photo detectors, such as one or more photo diodes. In these illustrative examples, vibration measurement system 300 may be a laser Doppler vibrometer. Number of differences 324, in these illustrative examples, is a frequency or phase difference between number of reference beams 312 and number of responses 316.

The illustration of object detection environment 200 in FIG. 2 and the different components of object detection system 202 in FIG. 3 are not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional objects, in addition to object 208, may be present under surface 210 of ground 212 in FIG. 2. In still other advantageous embodiments, object 208 may be hidden on surface 210 of ground 212 by another object. For example, another object may be hidden under debris on surface 210 of ground 212 in FIG. 2. In still other advantageous embodiments, camera system 225 may not be needed. Instead of displaying identification 256 on images 254, identification 256 may be displayed on a map of the area in which ground vehicle 206 in FIG. 2 is travelling.

Figure 4:
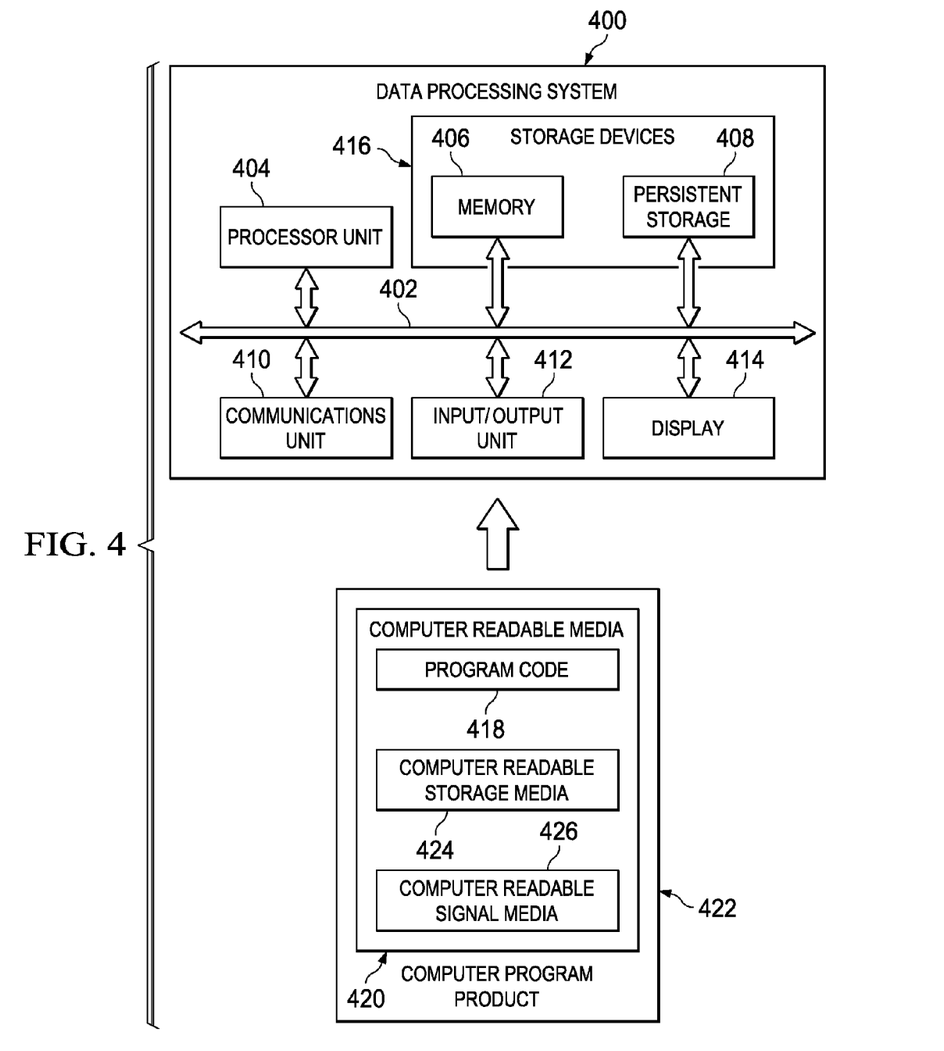
FIG. 4 is an illustration of a data processing system in accordance with an advantageous embodiment.

Turning now to FIG. 4, an illustration of a data processing system is depicted in accordance with an advantageous embodiment. In this illustrative example, data processing system 400 is an example of one implementation for controller 220 in FIG. 2. Data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these illustrative examples, computer readable storage media 424 is a non-transitory computer readable storage medium.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

Figure 5:
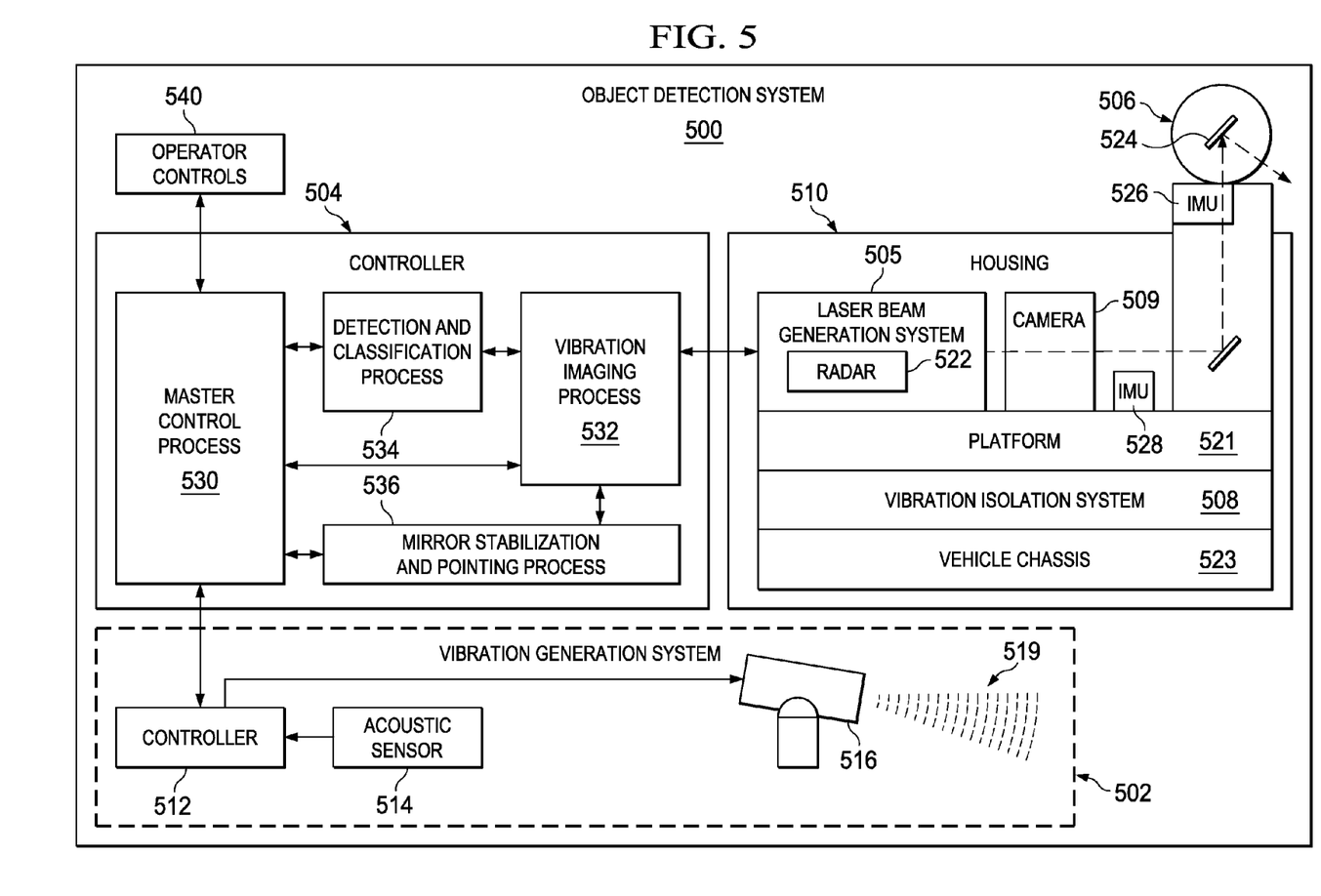
FIG. 5 is an illustration of an object detection system in accordance with an advantageous embodiment.

With reference now to FIG. 5, an illustration of an object detection system is depicted in accordance with an advantageous embodiment. In this illustrative example, object detection system 500 is an example of one implementation for object detection system 202 in FIG. 2. Further, object detection system 500 may be used to implement object detection system 104 in FIG. 1.

As depicted, object detection system 500 includes vibration generation system 502, controller 504, laser beam generation system 505, optical system 506, vibration isolation system 508, and camera 509. Laser beam generation system 505, optical system 506, vibration isolation system 508, and camera 509 are located within housing 510 in this example.

Vibration generation system 502 includes controller 512, acoustic sensor 514, and source 516. In this illustrative example, controller 512 operates source 516 to generate acoustic energy in the form of sound waves 519.

Source 516 may be, for example, without limitation, a seismic source. A seismic source is a system that is configured to generate seismic energy. This seismic energy is one example of acoustic energy. The seismic source may be, for example, without limitation, speakers, a seismic vibrator, a ground thumper, and/or some other suitable type of source of acoustic energy. In some illustrative examples, source 516 may be an explosion generation device, such as a detonation wave array projector.

In this example, acoustic sensor 514 is configured to generate information about sound waves 519 generated by vibration generations system 502. For example, this information may include the times at which the sound waves are detected by acoustic sensor 514. This information is sent to controller 512.

In this depicted example, laser beam generation system 505, optical system 506, and camera 509 are positioned on platform 521. Laser beam generation system 505 and optical system 506 form a vibration measurement system. Laser beam generation system 505 takes the form of laser detection and ranging (LADAR) system 522 in this example. Laser detection and ranging system 522 generates a number of laser beams directed towards optical system 506. Further, laser detection and ranging system 522 includes a detection system, such as detection system 306 in FIG. 3.

Optical system 506 includes number of mirrors 524. Number of mirrors 524 is configured to direct the number of laser beams generated by laser beam generation system 505 to a surface of a ground. As depicted, each of number of mirrors 524 is positioned such that the number of laser beams contacts each mirror at a substantially 45 degree angle in this illustrative example.

Optical system 506 is also configured to direct responses to the number of laser beams to laser detection and ranging system 522 in this example. These responses are vibrations. Further, laser detection and ranging system 522 sends the number of responses to the number of laser beams to controller 504.

In this illustrative example, vibration isolation system 508 is associated with platform 521. Further, platform 521 is associated with vehicle chassis 523. Vehicle chassis 523 is the part of a vehicle to which object detection system 500 is attached. Vibration isolation system 508 is used to reduce the effects of vibrations caused by movement of the vehicle, the engine, movement over terrain, and/or other factors on the vibration measurement system. Further, vibration isolation system 508 is used to stabilize platform 521.

In this illustrative example, inertial measurement unit 526 and inertial measurement unit 528 are configured to identify at least one of the location and movement of the vehicle associated with object detection system 500. This information may be used to stabilize the vibration measurement system. Further, this information is sent to controller 504.

Controller 504 includes master control process 530, vibration imaging process 532, detection and classification process 534, and mirror stabilization and pointing process 536. Mirror stabilization and pointing process 536 receives information from inertial measurement unit 526 and inertial measurement unit 528. This information is used by mirror stabilization and point process 536 to generate commands to stabilize and position number of mirrors 524.

In particular, mirror stabilization and pointing process 536 uses the information from inertial measurement unit 526 and inertial measurement unit 528 to point number of mirrors 524 such that the laser beams generated by laser beam generation system 505 are directed towards the ground.

In this illustrative example, vibration imaging process 532 is configured to receive the number of responses to the number of laser beams from laser detection and ranging system 522. Vibration imaging process 532 generates an image using the number of responses. This image is a two-dimensional image in this example.

Additionally, this image contains information about the responses to the number of laser beams. This information includes, for example, without limitation, frequency, amplitude, and phase data for the responses to the number of laser beams. In other words, the image contains data about the vibrations generated in response to the number of laser beams.

Further, the image is generated with respect to the position on the ground at which the number of laser beams hit the ground. Vibration imaging process 532 obtains this position on the ground from mirror stabilization and pointing process 536. The image generated by vibration imaging process 532 is then sent to detection and classification process 534.

In this illustrative example, detection and classification process 534 identifies objects found under the surface of the ground using the image received from vibration imaging process 532. In particular, detection and classification process 534 uses the data in the image about the vibrations generated in response to the number of laser beams to identify when an object is found. This object may be, for example, an improvised explosive device.

In this illustrative example, master control process 530 controls controller 512 to control the operation of vibration generation system 502. For example, master control process 530 determines the frequency at which sound waves are generated by vibration generation system 502. In other words, master control process 530 controls the frequency at which commands are sent to source 516 to generate sound waves 519. Additionally, master control process 530 receives information from acoustic sensor 514. Master control process 530 uses this information to control vibration generation system 502.

As illustrated, master control process 530 may send the image generated by vibration imaging process 532 for display to an operator. The operator may use operator controls 540 to adjust the different components within object detection system 500 based on the image displayed.

For example, after viewing images for different locations on the ground that are scanned for objects hidden in the ground, an operator may desire to rescan a previously scanned location. The operator sends commands to master control process 530 using operator controls 540. These commands are then processed by master control process 530. Master control process 530 controls mirror stabilization and pointing process 536 to adjust number of mirrors 524 such that the laser beams hit the previously scanned location on the ground based on the processed commands.

As yet another example, after viewing an image for an area of the ground, an operator may want to rescan a particular portion of the area. For example, an operator may want to rescan the particular portion of the area to provide a more detailed image for the particular portion of the area. The operator sends commands to master control process 530 using operator controls 540. These commands are processed.

Based on these processed commands, master control process 530 controls mirror stabilization and pointing process 536 such that number of mirrors 524 is adjusted to move the locations at which the laser beams hit the ground closer together. In other words, the distances between the locations at which the laser beams hit the ground is reduced. This reduction allows an image with a higher resolution for the particular portion of the area to be generated.

In this illustrative example, master control process 530 receives input from an operator of the vehicle through operator controls 540. Operator controls 540 may allow an operator to make adjustments to object detection system 500. For example, operator controls 540 allow an operator to change the parameters for laser beam generation system 505. Requests for these types of changes are processed by master control process 530.

In this depicted example, camera 509 is configured to generate images of the ground. These images may be, for example, photographs.

Figure 6:
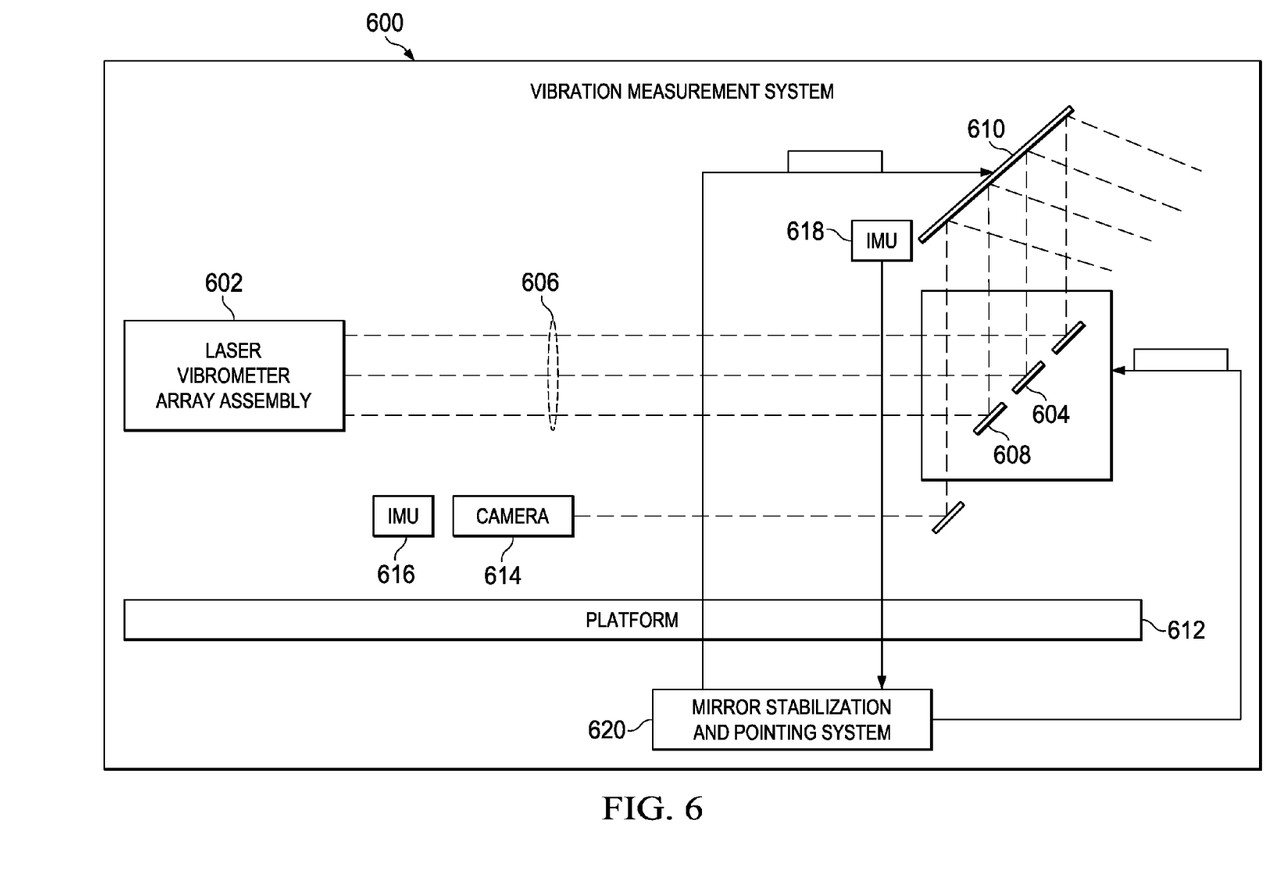
FIG. 6 is an illustration of a vibration measurement system in accordance with an advantageous embodiment.

With reference now to FIG. 6, an illustration of a vibration measurement system is depicted in accordance with an advantageous embodiment. In this illustrative example, vibration measurement system 600 is an example of one implementation for vibration measurement system 216 in FIG. 2.

Vibration measurement system 600 includes laser vibrometer array assembly 602 and optical system 604. Laser vibrometer array assembly 602 functions as both a laser beam generation system and a detection system in this illustrative example. Laser vibrometer array assembly 602 may contain any number of laser vibrometers. In this illustrative example, laser vibrometer array assembly 602 includes 24 laser vibrometers. Of course, in other illustrative examples, other numbers of laser vibrometers may be used.

Laser vibrometer array assembly 602 generates laser beams 606 directed towards optical system 604. Optical system 604 is comprised of mirrors that direct laser beams 606 towards a surface of a ground. For example, number of mirrors 608 directs laser beams 606 towards mirror 610. In turn, mirror 610 directs laser beams 606 towards the surface of the ground.

Laser vibrometer array assembly 602 and optical system 604 are associated with platform 612 in this example. Further, camera 614 and inertial measurement unit 616 are also associated with platform 612 in this example. Camera 614 generates images of the surface of the ground. These images may be superimposed with the images generated using the responses received from laser beams 606. Inertial measurement unit 616 generates information that is used to stabilize platform 612.

In this illustrative example, inertial measurement unit 618 is positioned near mirror 610. Inertial measurement unit 618 generates information that is sent to mirror stabilization and pointing system 620. Mirror stabilization and pointing system 620 uses this information to stabilize and point number of mirrors 608 and mirror 610 to direct laser beams 606 towards the surface of the ground.

Further, mirror stabilization and pointing system 620 is configured to continuously adjust the direction in which number of mirrors 608 and mirror 610 are pointed as laser beams 606 scan the surface of the ground. For example, mirror stabilization and pointing system 620 may continually adjust the direction in which number of mirrors 608 and mirror 610 are pointed based on a selected pattern for scanning the surface of the ground. This pattern may be selected by an operator.

In this illustrative example, mirror stabilization and pointing system 620 points number of mirrors 608 and mirror 610 in directions such that laser beams 606 hit the ground within a selected area at a selected location based on the selected pattern for scanning the surface of the ground.

For example, the selected pattern may include a plurality of reference locations at which the laser beams are to be directed. Each reference location in the plurality of locations is identified by mirror stabilization and pointing system 620 using a coordinate system. In this example, any coordinate system may be used, such as, for example, a Cartesian coordinate system, a geographic coordinate system, or some other suitable type of coordinate system.

As one illustrative example, for a particular reference location in the plurality of locations, mirror stabilization and pointing system 620 points mirror 610 such that laser beams 606 are directed generally at the reference location. In other words, laser beams 606 are directed at the particular location such that each of laser beams 606 is within a selected area around the reference location. For example, laser beams 606 may be directed towards the surface of the ground at the reference location such that the laser beams hit the ground within an area having a selected shape and/or size centered on the reference location.

Additionally, mirror stabilization and pointing system 620 points each of number of mirrors 608 in a direction such that each laser beam is directed at a particular location within the selected area around the reference location. More specifically, number of mirrors 608 is pointed such that laser beams 606 hit the ground within a selected distance between each other.

In this illustrative example, when the platform on which vibration measurement system 600 is located moves and/or a new reference location is selected from the selected pattern, mirror stabilization and pointing system 620 adjusts the direction in which number of mirrors 608 and/or mirror 610 are pointed.

Additionally, laser beams 606 may be directed at a reference location on the ground for a selected period of time. This period of time may be selected by the operator. The platform on which vibration measurement system 600 is located may move on the ground during this selected period of time. Mirror stabilization and pointing system 620 is configured to stabilize and adjust number of mirrors 608 and/or mirror 610 such that laser beams 606 continue to hit the reference location on the ground while the platform moves.

Figure 7:
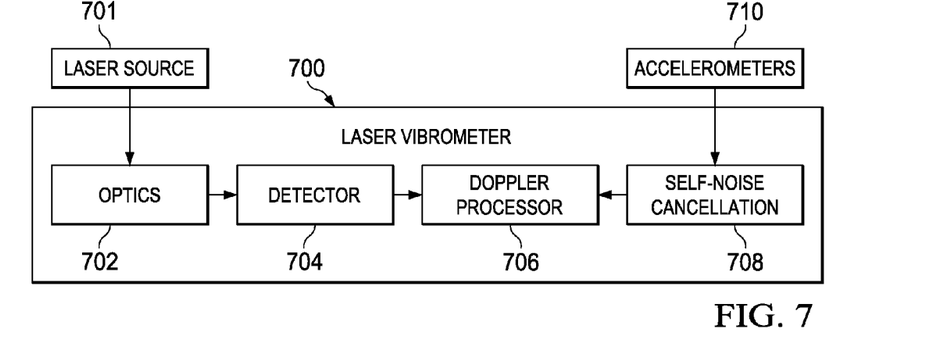
FIG. 7 is an illustration of a laser vibrometer in accordance with an advantageous embodiment.

With reference now to FIG. 7, an illustration of a laser vibrometer is depicted in accordance with an advantageous embodiment. In this illustrative example, laser vibrometer 700 is an example of one implementation for a laser vibrometer in laser vibrometer array assembly 602 in FIG. 6.

As depicted, laser vibrometer 700 includes optics 702, detector 704, Doppler processor 706, and self-noise cancellation 708. Laser vibrometer 700 receives a laser beam from laser source 701 at optics 702.

Optics 702 is configured to direct a first portion of the laser beam to one of a number of mirrors, such as number of mirrors 608 in FIG. 6. Optics 702 is configured to direct a second portion of the laser beam towards detector 704. This second portion is a reference beam. Further, optics 702 is also configured to direct a response to the first portion of the laser beam from the ground towards detector 704.

In this depicted example, optics 702 directs the response to the first portion of the laser beam and the reference beam to detector 704 along the same axis. In this manner, the response to the first portion of the laser beam and the reference beam are combined to form a signal that reaches detector 704.

Doppler processor 706 receives the signal detected by detector 704. Doppler processor 706 processes this signal to remove undesired information from the signal such that only information about vibrations is present in the signal. The undesired information may include, for example, information about the relative velocity of the vehicle, and/or other suitable types of undesired information.

Self-noise cancellation 708 is configured to remove additional undesired information in the signal. This additional undesired information is about undesired vibrations. For example, the signal may contain undesired vibration signatures caused by, for example, without limitation, movement of the platform on which the object detection system is located, engine noise, changes in the path for the laser beam, and/or other suitable sources of vibrations.

In this illustrative example, accelerometers 710 generate information that is used by self-noise cancellation 708 to remove the undesired vibration signatures from the signal.

Using self-noise cancellation 708, Doppler processor 706 identifies which vibration signatures in the signal are sent to a vibration imaging process, such as vibration imaging process 532 in FIG. 5. In this manner, the vibration signatures remaining in the signal after the undesired information is removed may be used to generate images.

Figure 8:
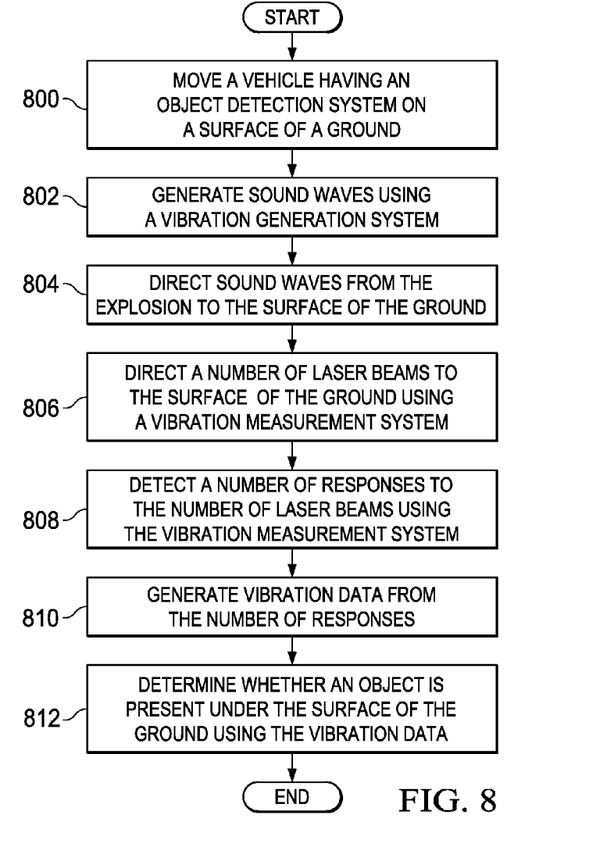
FIG. 8 is an illustration of a flowchart of a process for detecting objects in accordance with an advantageous embodiment.

With reference now to FIG. 8, an illustration of a flowchart of a process for detecting objects is depicted in accordance with an advantageous embodiment. The process illustrated in FIG. 8 may be implemented using object detection system 202 in FIG. 2.

The process begins by moving a vehicle having an object detection system on a surface of a ground (operation 800). The object detection system comprises a vibration generation system, a vibration measurement system, and a controller. Sound waves are generated using the vibration generation system (operation 802). The sound waves are directed to the surface of the ground (operation 804).

Next, a number of laser beams are directed to the surface of the ground using the vibration measurement system (operation 806). In operation 806, the number of laser beams is directed to the surface of the ground using a number of mirrors for an optical system in the vibration measurement system. In particular, the number of mirrors direct the number of laser beams to the surface such that the number of laser beams have a selected spatial arrangement with respect to the surface.

Thereafter, a number of responses to the number of laser beams are detected using the vibration measurement system (operation 808). The vibration measurement system then generates vibration data from the number of responses (operation 810).

Thereafter, the process determines whether an object is present under the surface of the ground using the vibration data (operation 812), with the process terminating thereafter.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for detecting objects. In particular, the different advantageous embodiments provide a method and apparatus for detecting objects that may be hidden under the ground. In one advantageous embodiment, an object detection system comprises a vibration generation system, a vibration measurement system, and a controller.

The vibration generation system is configured to generate acoustic energy that causes the vibrations to occur in the ground. The vibration measurement system is configured to transmit a number of laser beams to a surface of the ground, receive a number of responses to the number of laser beams, and generate vibration data from the number of responses. The controller is configured to determine whether or not an object is present under the surface of the ground using the vibration data.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed.

Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a vibration generation system configured to generate acoustic energy that causes vibrations to occur in a ground;
    a vibration measurement system configured to transmit a number of laser beams to a surface of the ground in which the vibrations occur; receive a number of responses to the number of laser beams; and generate vibration data from the number of responses;
    an optical system associated with the vibration measurement system and configured to direct the number of laser beams to the surface of the ground such that the number of laser beams has a selected spatial arrangement relative to the surface;
    a controller configured to determine whether an object is present under the surface of the ground using the vibration data;
    a vehicle, wherein the vibration measurement system, the vibration generation system, and the controller are associated with the vehicle; and
    a location system configured to identify movement of the vehicle, wherein the controller is configured to control movement of the number of laser beams to a number of locations on the surface of the ground while the vehicle is moving such that the number of laser beams remain at the number of locations for a period of time sufficient to obtain a sufficient response to generate the vibration data that can be used for determining whether the object is present under the surface of the ground at the number of locations.

2. The apparatus of claim 1 further comprising:
    a vibration isolation system associated with the vehicle, wherein the vibration isolation system is configured to reduce an effect of undesired vibrations on measurements made by the vibration measurement system.

3. The apparatus of claim 2, wherein the vibration isolation system is selected from at least one of the group consisting of an active vibration isolation system and a passive vibration isolation system.

4. The apparatus of claim 1, wherein the vibration measurement system comprises:
    a laser beam generation system configured to generate the number of laser beams and a number of reference beams, wherein a portion of each laser beam in the number of laser beams forms a reference beam in the number of reference beams; and
    a detection system configured to detect a number of differences between the number of reference beams and the number of responses and generate the vibration data from the number of differences between the number of reference beams and the number of responses.

5. The apparatus of claim 1, wherein the optical system is part of the vibration measurement system and comprises:
    a number of mirrors configured to direct the number of laser beams to a location on the surface of the ground such that the number of laser beams has the selected spatial arrangement at the location on the surface; change the selected spatial arrangement of the number of laser beams such that the vibration data has a desired resolution; and direct the number of responses and the reference beam along an axis to the detection system.

6. The apparatus of claim 5 further comprising:
an inertial measurement unit associated with the optical system, wherein the inertial measurement unit generates information about movement of the optical system and wherein the controller is configured to generate adjustments to maintain the number of laser beams at a desired location on the surface of the ground in response to the movement of the optical system.

7. The apparatus of claim 1, wherein the acoustic energy takes the form of sound waves, and wherein the sound waves cause the vibrations to occur in the ground.

8. The apparatus of claim 1 further comprising:
a database of vibration signatures for objects.

9. The apparatus of claim 1, wherein the controller comprises at least one selected from the group consisting of a processor unit, a computer system, and a hardware unit.

10. The apparatus of claim 1, wherein the controller is configured to control movement of the number of laser beams to a number of locations on the surface of the ground.

11. The apparatus of claim 1 further comprising:
a camera system configured to generate images of the surface of the ground; and
a display device, wherein the controller is configured to display the images of the surface of the ground on the display device and display an identification of a location of the object under the ground in a location on the image corresponding to the location of the object.

12. A method for detecting objects, the method comprising:
moving a vehicle along a surface of a ground, wherein the vehicle has an object detection system comprising a vibration generation system configured to generate acoustic energy that causes vibrations to occur in the ground; a vibration measurement system configured to transmit a number of laser beams to the surface of the ground in which the vibrations occur, receive a number of responses to the number of laser beams, and generate vibration data from the number of responses; an optical system associated with the vibration measurement system and configured to direct the number of laser beams to the surface of the ground such that the number of laser beams has a selected spatial arrangement relative to the surface; and a controller configured to determine whether an object is present under the surface of the ground using the vibration data;
generating information about movement of the optical system using an inertial measurement unit associated with the optical system;
generating adjustments to maintain the number of laser beams at a desired location on the surface of the ground in response to the movement of the optical system; and
determining whether the object is present under the ground using the object detection system.

13. The method of claim 12, wherein the step of determining whether the object is present under the ground using the object detection system comprises:
determining whether the object is present under the ground using the object detection system while the vehicle is moving.

14. The method of claim 12 further comprising:
generating acoustic energy that causes vibrations to occur in the ground;
directing the number of laser beams to the surface of the ground using the optical system;
detecting the number of responses to the number of laser beams;
generating the vibration data from the number of responses; and
determining whether the object is present using the vibration data.

15. The method of claim 14 further comprising:
generating the number of laser beams and a reference beams using a laser beam generation system.

16. The method of claim 15, wherein the step of generating the vibration data from the number of responses comprises:
detecting a number of differences between the number of reference beams and the number of responses; and
generating the vibration data from the number of differences between the number of reference beams and the number of responses.

17. The method of claim 14, wherein the step of directing the number of laser beams to the surface of the ground comprises:
directing the number of laser beams to a location on the surface of the ground using a number of mirrors for the optical system such that the number of laser beams has the selected spatial arrangement at the location on the surface; and
wherein the step of detecting the number of responses to the number of laser beams comprises:
directing the number of responses and the number of reference beams along an axis to a detection system using the number of mirrors.

18. The method of claim 14, wherein the step of directing the number of laser beams to the surface of the ground comprises:
changing the selected spatial arrangement for the number of laser beams such that the vibration data generated from the number of responses to the number of laser beams having the selected spatial arrangement has a desired resolution.

19. An apparatus comprising:
a vibration generation system configured to generate acoustic energy that causes vibrations to occur in a ground;
a vibration measurement system configured to transmit a number of laser beams to a surface of the ground in which the vibrations occur; receive a number of responses to the number of laser beams; and generate vibration data from the number of responses;
an optical system associated with the vibration measurement system and configured to direct the number of laser beams to the surface of the ground such that the number of laser beams has a selected spatial arrangement relative to the surface;
a controller configured to determine whether an object is present under the surface of the ground using the vibration data;
wherein the optical system is part of the vibration measurement system and comprises:
a number of mirrors configured to direct the number of laser beams to a location on the surface of the ground such that the number of laser beams has the selected spatial arrangement at the location on the surface; change the selected spatial arrangement of the number of laser beams such that the vibration data has a desired resolution; and direct the number of responses and the reference beam along an axis to the detection system; and
an inertial measurement unit associated with the optical system, wherein the inertial measurement unit generates information about movement of the optical system and wherein the controller is configured to generate adjustments to maintain the number of laser beams at a desired location on the surface of the ground in response to the movement of the optical system.

20. The apparatus of claim 19 further comprising:
a vehicle, wherein the vibration measurement system, the vibration generation system, and the controller are associated with the vehicle.

21. The apparatus of claim 20 further comprising:
a vibration isolation system associated with the vehicle, wherein the vibration isolation system is configured to reduce an effect of undesired vibrations on measurements made by the vibration measurement system.

22. The apparatus of claim 19, wherein the vibration measurement system comprises:
a laser beam generation system configured to generate the number of laser beams and a number of reference beams, wherein a portion of each laser beam in the number of laser beams forms a reference beam in the number of reference beams; and
a detection system configured to detect a number of differences between the number of reference beams and the number of responses and generate the vibration data from the number of differences between the number of reference beams and the number of responses.

23. The apparatus of claim 19 further comprising:
a camera system configured to generate images of the surface of the ground; and
a display device, wherein the controller is configured to display the images of the surface of the ground on the display device and display an identification of a location of the object under the ground in a location on the image corresponding to the location of the object.

* * * * *